US009374732B2

(12) United States Patent
Nammi et al.

(10) Patent No.: US 9,374,732 B2
(45) Date of Patent: Jun. 21, 2016

(54) COMMON PILOT GATING IN A MULTI-ANTENNA WIRELESS COMMUNICATION SYSTEM

(71) Applicant: Telefonaktiebolaget L M Ericsson (publ), Stockholm (SE)

(72) Inventors: Sairamesh Nammi, Stockholm (SE); Bo Göransson, Sollentuna (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 184 days.

(21) Appl. No.: 14/368,316

(22) PCT Filed: Feb. 1, 2013

(86) PCT No.: PCT/SE2013/050087
§ 371 (c)(1),
(2) Date: Jun. 24, 2014

(87) PCT Pub. No.: WO2013/115723
PCT Pub. Date: Aug. 8, 2013

(65) Prior Publication Data
US 2014/0347992 A1    Nov. 27, 2014

Related U.S. Application Data

(60) Provisional application No. 61/593,590, filed on Feb. 1, 2012.

(51) Int. Cl.
*H04L 12/26* (2006.01)
*H04W 28/02* (2009.01)
(Continued)

(52) U.S. Cl.
CPC ......... *H04W 28/0247* (2013.01); *H04B 7/0404* (2013.01); *H04L 5/005* (2013.01);
(Continued)

(58) Field of Classification Search
CPC ...................................................... H04L 47/10
USPC ........................................................ 370/235
See application file for complete search history.

(56) References Cited

U.S. PATENT DOCUMENTS

| 2004/0166886 | A1* | 8/2004 | Laroia ................. H04B 7/0491 455/522 |
| 2006/0199577 | A1 | 9/2006 | Ramakrishna et al. |
| 2008/0076464 | A1* | 3/2008 | Hara ................... H04W 52/325 455/522 |

FOREIGN PATENT DOCUMENTS

WO    2010106549 A2    9/2010

OTHER PUBLICATIONS

Ericsson, "4-branch MIMO for HSDPA", 3GPP TSG RAN WG1 Meeting #65, Barcelona, Spain, May 9, 2011, pp. 1-17, R1-111763, 3GPP.

(Continued)

*Primary Examiner* — Christopher R Crompton
(74) *Attorney, Agent, or Firm* — Patent Portfolio Builders, PLLC

(57) ABSTRACT

A multi-antenna base station (16) is configured to transmit a plurality of common pilot channels. The base station (16) obtains information that indicates when the base station (16) is to gate the transmission of a subset of the common pilot channels. The base station (16) also receives from a wireless device (12) a channel state information (CSI) report for a current reporting period. This CSI report was generated by the wireless device (12) based on one or more measurements of one or more of the common pilot channels. The base station (16) notably also determines based on the obtained information and for each of the measurements, whether the base station (16) gated the transmission of the subset when that measurement was performed. Then, depending on that determination, the base station (16) selectively performs data transmission scheduling at the base station (16) based on one or more CSI reports received from the wireless device (12) for one or more previous reporting periods.

22 Claims, 11 Drawing Sheets

(51) Int. Cl.

| | | |
|---|---|---|
| *H04W 72/12* | (2009.01) | |
| *H04W 52/02* | (2009.01) | |
| *H04L 5/00* | (2006.01) | |
| *H04B 7/04* | (2006.01) | |
| *H04W 24/10* | (2009.01) | |
| *H04W 52/36* | (2009.01) | |
| *H04L 1/00* | (2006.01) | |
| *H04W 52/44* | (2009.01) | |
| *H04W 52/38* | (2009.01) | |

(52) U.S. Cl.
CPC .............. *H04L 5/006* (2013.01); *H04L 5/0023* (2013.01); *H04L 5/0048* (2013.01); *H04L 5/0094* (2013.01); *H04W 24/10* (2013.01); *H04W 52/0216* (2013.01); *H04W 72/1231* (2013.01); *H04L 1/0027* (2013.01); *H04W 52/367* (2013.01); *H04W 52/38* (2013.01); *H04W 52/44* (2013.01); *Y02B 60/50* (2013.01)

(56) References Cited

OTHER PUBLICATIONS

Ericsson, et al., "Impact of Common Pilot Gating on the 4 branch MIMO Link Performance", 3GPP TSG RAN WG1 Meeting #68, Dresden, Germany, Feb. 2, 2006, pp. 1-7, R1-12053, 3GPP.

Ericsson, "New WI: Four Branch MIMO transmission for HSDPA", 3GPP TSG-RAN meeting #53, Fukuoka, Japan, Sep. 13, 2011, pp. 1-6, RP-111393, 3GPP Work Item Description, Title: Four Branch MIMO transmission for HSDPA (core part), Acronym: 4Tx-HSDPA-core, 3GPP.

Ericsson, "New WI: Four Branch MIMO transmission for HSDPA", 3GPP TSG-RAN meeting #53, Fukuoka, Japan, Sep. 13, 2011, pp. 1-5, RP-111393, 3GPP Work Item Description, Title: Four Branch MIMO transmission for HSDPA (feature part), Acronym: 4Tx-HSDPA, 3GPP.

Ericsson, "New WI: Four Branch MIMO transmission for HSDPA", 3GPP TSG-RAN meeting #53, Fukuoka, Japan, Sep. 13, 2011, pp. 1-5, RP-111393, 3GPP Work Item Description, Title: Four Branch MIMO transmission for HSDPA (performance part), Acronym: 4Tx-HSDPA-perf, 3GPP.

\* cited by examiner

Table 1:

| Power setting for 3rd and 4th Pilot in dB | % Loss compared to no gating | | | | |
|---|---|---|---|---|---|
| | GDC =16.67 | GDC = 25 | GDC = 50 | GDC = 75 | GDC = 83.33 |
| -13 | 6.03 | 12.33 | 19.06 | 29.78 | 31.71 |
| -16 | 6.45 | 10.57 | 20.03 | 29.24 | 32.23 |
| -19 | 5.5 | 10.46 | 19.76 | 29.39 | 32.22 |

Table 2:

| Power setting for 3rd and 4th Pilot in dB | % Loss compared to no gating | | | | |
|---|---|---|---|---|---|
| | GDC= 16.67 | GDC = 25 | GDC = 50 | GDC=75 | GDC=83.33 |
| -13 | 25.71 | 54.78 | 73.24 | 96.06 | 91.29 |
| -16 | 24.48 | 57.09 | 74.09 | 96.49 | 91.58 |
| -19 | 23.54 | 59.22 | 75.09 | 95.79 | 92.3 |

FIG. 7

COMMON PILOT GATING IN A MULTI-ANTENNA WIRELESS COMMUNICATION SYSTEM

RELATED APPLICATIONS

The present application claims priority to U.S. Provisional Patent Application No. 61/593,590, filed Feb. 1, 2012, the entire contents of which is incorporated herein by reference.

TECHNICAL FIELD

The present invention generally relates to channel state information reporting in a multi-antenna wireless communication system, and particularly relates to channel state information reporting when the transmission of a subset of common pilot channels is gated.

BACKGROUND

Multi-antenna wireless communication systems have generally grown more advanced over time by the introduction of additional antennas. For example, previous versions of High Speed Downlink Packet Access (HSDPA) supported downlink transmission using up to two transmit antennas. Forthcoming versions of HSDPA, however, will support downlink transmission using up to four transmit antennas (also known as 4 branch MIMO). See, e.g., RP-111393, "New WI: Four Branch MIMO transmission for HSDPA," and R1-111763, 4-branch MIMO for HSDPA. While introducing additional transmit antennas will advantageously increase the downlink performance of those wireless devices newly configured to receive transmissions from four transmit antennas, it threatens to actually decrease the downlink performance of other, legacy wireless devices.

More particularly, in order to support multi-antenna transmission (e.g., spatial multiplexing), a wireless device must obtain different channel estimates for each spatial layer, in order to individually characterize each layer. A device obtains such channel estimates by measuring a pilot channel transmitted from each antenna. Thus, the introduction of additional antennas leads to the introduction of additional pilot channels.

In more detail, pilot channels serve two main functions. First, a wireless device uses pilot channel estimates to estimate or otherwise determine so-called channel state information (CSI) estimation. CSI includes a recommended rank (i.e., the number of spatial layers), a channel quality indicator (CQI), and a precoding control indicator (PCI). Second, a wireless device uses pilot channel estimates to estimate the channel for demodulation purposes.

In HSPDA versions that will support 4 transmit antennas, two different approaches are possible for transmitting pilot channels. The first approach just employs so-called common pilot channels (one for each antenna) that are transmitted to all wireless devices in a cell, without device-specific beamforming. Devices measure these common pilot channels for both CSI determination and channel estimation for demodulation. The second approach, by contrast, employs common pilot channels for CSI determination, but employs dedicated pilot channels for estimating the channel for demodulation. A dedicated pilot channel is transmitted to a specific device and may be beamformed specifically for that device. Beamforming a pilot channel specifically for a device improves the orthogonality of the pilot channel with the HS-PDSCH (High-Speed Physical Downlink Shared Channel) and reduces the energy needed for the pilot channel.

Regardless of the particular approach, though, the threat to the downlink performance of legacy devices can arise if the newly introduced common pilot channels are transmitted (e.g., with high power) during time intervals in which legacy devices, which are not able to demodulate transmissions from four antennas, are scheduled. These legacy devices cannot make use of the energy in the newly introduced common pilot channels. Worse, the energy in the newly introduced common pilot channels will reduce the amount of energy available for HS-PDSCH scheduling to the legacy devices and act as interference which will detoriate the channel quality.

One approach to reducing the performance impacts to legacy devices is to "gate" newly introduced common pilot channels. Known techniques for gating a common pilot channel simply transmit the common pilot channel less frequently (i.e., occasionally "transmit" the common pilot with zero power as opposed to high power when the pilot is not gated).

The gating approach appears promising for reducing the performance degradation of legacy devices, but under some circumstances would counteract the performance improvements achieved for non-legacy devices via four antenna transmission. Indeed, CSI determination by non-legacy devices during gating would be less reliable, since the CSI determination would be based on only 2 common pilot channels rather than 4. Transmissions scheduled based on such CSI will likely fail, resulting in poor performance.

Another approach to reducing the performance impacts to legacy devices is to reduce to a low value the power of common pilot channels newly introduced for CSI determination, and to introduce other common pilot channels for data demodulation. For example, in some forthcoming 4TX HSDPA versions, 6 common pilot channels rather than just 4 will be transmitted to wireless devices in a cell without device-specific beamforming. In this case, though, 2 of the common pilot channels will be continuously transmitted with high power on two antennas and used by both legacy and non-legacy devices for CSI determination. Two other common pilot channels will be transmitted with low power on the other two antennas and used by only non-legacy devices for CSI determination. The 2 remaining common pilot channels will also be transmitted on the other two antennas, but will be transmitted with high power and used by non-legacy devices to estimate the channel for data demodulation. Because these remaining channels will be transmitted with high power, they will be transmitted less frequently, e.g., on an as needed basis. That is, these 2 remaining common pilot channels will be gated. More specifically, the 2 remaining common pilot channels will be gated by a base station when that base station is not transmitting data to at least one non-legacy wireless device configured to measure those 2 channels.

Introducing these 2 remaining common pilot channels will advantageously increase the downlink performance of those non-legacy wireless devices newly configured to receive those channels. But, when those 2 channels are being transmitted, they cause interference to the other 4 common pilot channels, meaning that a device (whether legacy or non-legacy) will not be able to report CSI as accurately using those 4 other common pilot channels. This interference is of course reduced to an extent by gating the 2 remaining common pilot channels, but the interference still proves unacceptable under some circumstances.

SUMMARY

One or more embodiments herein include a method for implementing pilot gating. Also, embodiments include methods to compute channel state information at a wireless device when pilot gating is applied. Finally, embodiments include a procedure to interpret the channel state information at the base station if pilot gating is applied.

More specifically, one or more embodiments herein include a method implemented by a multi-antenna base station configured to transmit a plurality of common pilot channels. The method includes obtaining at the base station information that indicates when the base station is to gate the transmission of a subset of said common pilot channels. The method further includes receiving from a wireless device a channel state information (CSI) report for a current reporting period. This CSI report was generated by the wireless device based on one or more measurements of one or more of said common pilot channels.

The method notably further entails determining, based on the obtained information and for each of said measurements, whether the base station gated the transmission of said subset when that measurement was performed. The method then includes, depending on said determination, selectively performing data transmission scheduling at the base station based on one or more CSI reports received from the wireless device for one or more previous reporting periods.

In some embodiments, selectively performing data transmission scheduling in this way entails performing such scheduling based on the one or more CSI reports for the one or more previous reporting periods if the base station did not gate the transmission of said subset when at least one of said measurements was performed. Otherwise, the scheduling is performed based on the CSI report for the current reporting period. In one such embodiment, for each of the one or more CSI reports for the one or more previous reporting periods, the base station gated the transmission of said subset when each measurement based on which the wireless device generated that CSI report was performed. In one or more of these and other embodiments, the obtained information indicates the base station is to gate the transmission of said subset when the base station is not transmitting data to at least one wireless device configured to measure said subset.

In other embodiments, selectively performing data transmission scheduling in this way entails performing such scheduling based on the one or more CSI reports for the one or more previous reporting periods if the base station gated the transmission of said subset when at least one of said measurements was performed. Otherwise, the scheduling is performed based on the CSI report for the current reporting period. In one such embodiment, for each of the one or more CSI reports for the one or more previous reporting periods, the base station did not gate the transmission of said subset when each measurement based on which the wireless device generated that CSI report was performed. In one or more of these and other embodiments, the obtained information indicates the base station is to gate the transmission of said subset according to a defined gating pattern.

Still other embodiments herein include a method implemented by a wireless device for reporting channel state information to a multi-antenna base station that transmits a plurality of common pilot channels. The method includes obtaining information that indicates when the transmission of a subset of said common pilot channels is gated by the base station. The method also includes performing one or more measurements of one or more of said common pilot channels. The method also notably includes determining channel state information based on whether, according to the obtained information and for each of said measurements, the transmission of said subset is gated when that measurement is performed. Finally, the method includes reporting the determined channel state information to the base station for a current reporting period.

In some embodiments, determining channel state information in this way entails selectively determining the channel state information from measurements performed when the transmission of said subset is gated. In one embodiment, for example, the device determines the channel state information to be reported for the current reporting period as a function of channel state information reported for one or more previous reporting periods, if the base station did not gate the transmission of the subset when at least one of said measurements (associated with the current reporting period) was performed. Otherwise, the channel state information to be reported for the current reporting period is determined based on said measurements (associated with the current reporting period). Each measurement from which the channel state information reported for the one or more previous reporting periods was performed when the transmission of said subset was gated.

In another embodiment, the device determines that a first set of said measurements are performed when the transmission of the subset is gated, and a second set of said measurements are performed when the transmission of the subset is not gated. In this case, the device selectively determines the channel state information from the first set but not the second set.

In other embodiments, by contrast, determining channel state information in this way entails selectively determining the channel state information from measurements performed when the transmission of said subset is not gated. In one embodiment, for example, the device determines the channel state information to be reported for the current reporting period as a function of channel state information reported for one or more previous reporting periods, if the base station gated the transmission of the subset when at least one of said measurements (associated with the current reporting period) was performed. Otherwise, the device determines the channel state information to be reported for the current reporting period based on said measurements (associated with the current reporting period). Each measurement from which the channel state information reported for the one or more previous reporting periods was performed when the transmission of said subset was not gated.

In another embodiment, the device determines that a first set of said measurements are performed when the transmission of the subset is gated, and a second set of said measurements are performed when the transmission of the subset is not gated. In this case, the device selectively determines the channel state information from the second set but not the first set.

One or more embodiments also include a method implemented by a multi-antenna base station configured to transmit a plurality of common pilot channels. The method includes obtaining information that indicates when the base station is to gate the transmission of a subset of said common pilot channels. The method also entails selectively gating the transmission of said subset of common pilot channels at defined time intervals indicated by the obtained information, by transmitting said subset of common pilot channels at a defined non-zero minimum power level during those defined time intervals. In at least one embodiment, the method also includes transmitting said subset of common pilot channels at a defined maximum level when the obtained information indicates the base station is not to gate the transmission of said subset.

Embodiments herein also include corresponding apparatus configured to perform the methods described above.

An advantage of one or more of the above embodiments is that CSI-reliant data transmission scheduling is performed in such a way that accounts for the gating of the subset of common pilot channels. In some embodiments, for example, data transmission scheduling is improved by basing that scheduling on one or more previous CSI reports that, given the gating of the subset, are deemed more accurate than a current CSI report.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 7 shows charts quantifying throughput degradation suffered without implementation of one or more embodiments herein.

DETAILED DESCRIPTION

Figure 1:
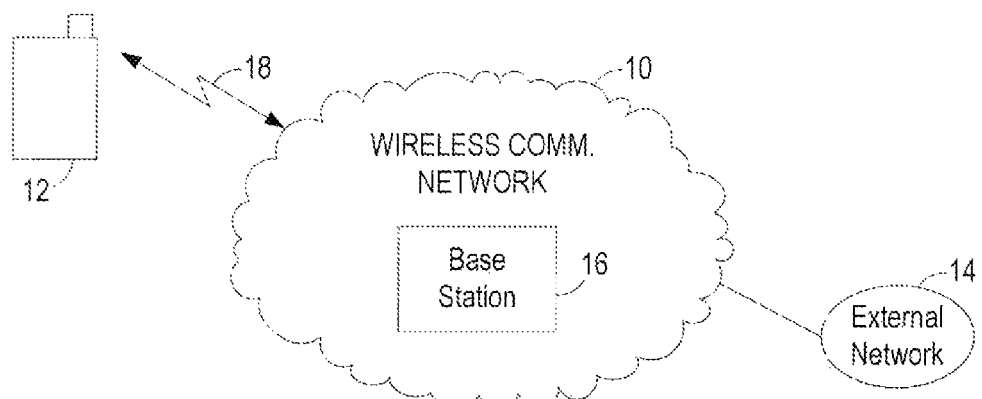
FIG. 1 is a block diagram of a wireless communication system that includes a base station and a wireless device configured according to one or more embodiments herein.

FIG. 1 illustrates a wireless communication system according to one or more embodiments. As shown, the system includes a wireless communication network 10 that wirelessly connects one or more wireless communication devices (or simply wireless devices) 12 to one or more external networks 14, such as a public switched telephone network (PSTN), a packet data network (PDN), or the like. More specifically in this regard, the network 10 includes one or more multi-antenna base stations 16 that communicate with the one or more wireless devices 12 over wireless communication resources.

A multi-antenna base station 16 transmits at least one common pilot channel on each of its transmit antennas. When transmitted, each common pilot channel is commonly transmitted for reception by all wireless devices configured to receive that channel (without device-specific beamforming). A wireless device configured to receive all or even just some of these common pilot channels performs one or more measurements of those channels in order to determine and report channel state information (CSI) for use by a base station 16 in scheduling data transmissions, in order to obtain channel estimates for demodulation purposes, or both.

Given a certain configuration of the wireless communication system, some wireless devices (i.e., legacy devices) are configured to receive only some of the common pilot channels, while other wireless devices (i.e., non-legacy devices) are configured to receive all of the common pilot channels. Thus, a certain subset of common pilot channels can only be received by non-legacy devices. Transmission of this subset generally facilitates improved downlink performance for non-legacy devices 12. But, the subset of common pilot channels interferes with or otherwise diminishes the accuracy with which CSI can be determined from the other common pilot channels.

Figure 2:
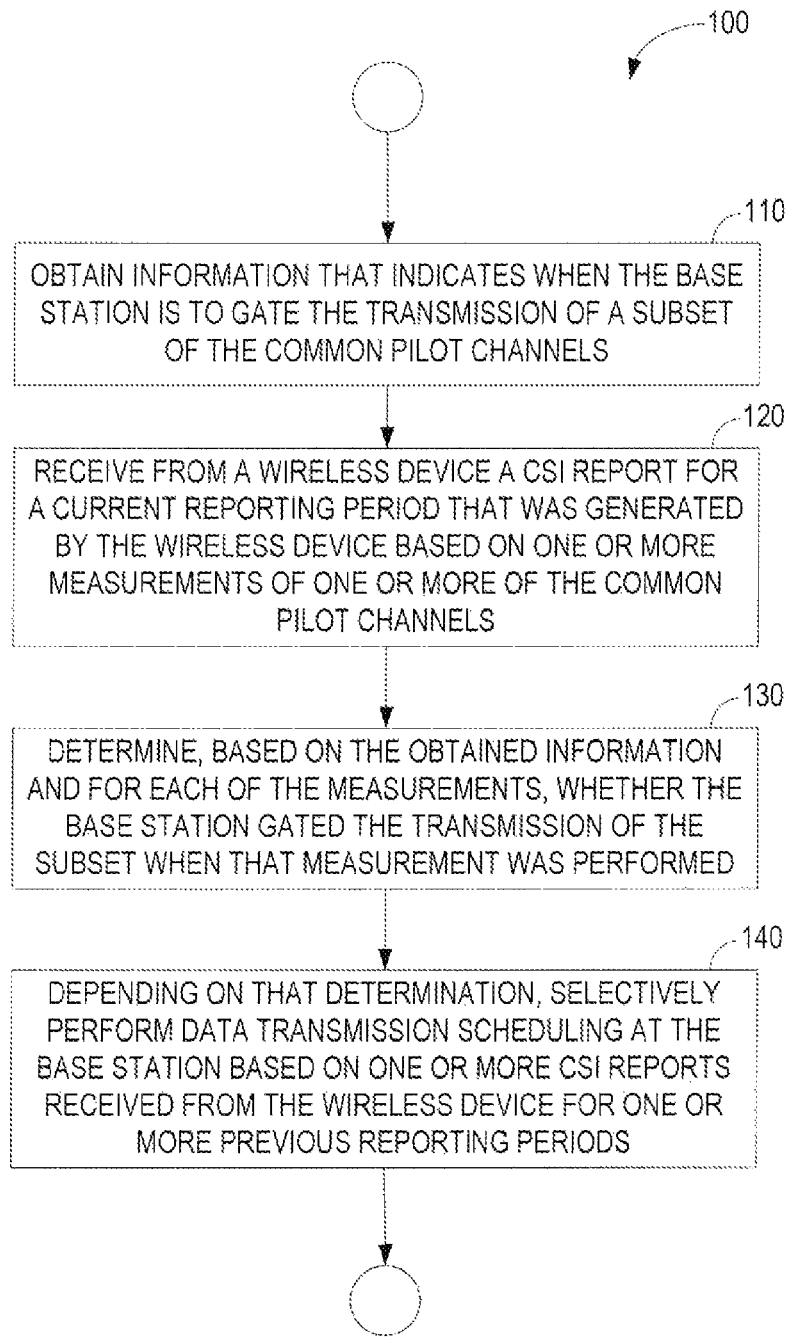
FIG. 2 is a logic flow diagram of a method performed by a base station according to one or more embodiments herein.

The base station 16 is configured to reduce interference attributable to the subset by periodically or occasionally gating the subset of common pilot channels, e.g., according to a gating pattern. In at least some embodiments, gating the subset entails refraining from transmitting the subset (or "transmitting" the subset with zero power). In other embodiments, explained more fully later, gating the subset entails transmitting the subset with only a defined minimum, non-zero power level. Regardless, one or more embodiments herein recognize that this gating affects CSI reporting and data transmission scheduling at the base station 16. One or more embodiments herein therefore include a base station 16 that advantageously performs CSI-reliant data transmission scheduling in such a way that accounts for the gating of a subset of common pilot channels. FIG. 2 shows processing performed by the base station 16 according to one such embodiment.

As shown in FIG. 2, processing 100 at the base station 16 includes obtaining information that indicates when the base station 16 is to gate the transmission of a subset of the common pilot channels (Block 110). In one embodiment, this information is obtained for instance by receiving the information from a base station controller (e.g., a radio network controller, RNC) via higher layer signaling (e.g., radio resource control, RRC, signaling). Regardless, processing 100 further includes receiving from a wireless device 12 a CSI report for a current reporting period (Block 120). This CSI report for the current reporting period was generated by the wireless device 12 based on one or more measurements of one or more of the common pilot channels.

Processing 100 at the base station then notably entails determining, based on the obtained information and for each of these measurements, whether the base station 16 gated the transmission of the subset when that measurement was performed (Block 130). Processing 100 then includes, depending on that determination, selectively performing data transmission scheduling at the base station 16 based on one or more CSI reports received from the wireless device 12 for one or more previous reporting periods (Block 140). As used herein, a CSI report received from the device 12 for a previous reporting period may also be referred to for convenience as a "previous" CSI report. Similarly, a CSI report received from the device 12 for a current reporting period may also be referred to as a "current" CSI report.

In at least some embodiments, this means selecting between performing data transmission scheduling at the base station 16 based on the one or more previous CSI reports and performing that scheduling based on the current CSI report, depending on the determination. And, when scheduling is performed based on the one or more previous CSI reports, the current CSI report is effectively disregarded, in favor of the one or more previous CSI reports. That is, the one or more previous CSI reports are re-used for scheduling, and the current CSI report is not used for scheduling.

In some embodiments, scheduling is performed based on just one previous CSI report. This previous CSI report may or may not actually have been reported for a reporting period that immediately precedes the current reporting period. In other embodiments, scheduling is performed based on multiple previous CSI reports. In this case, the multiple CSI reports may be linearly combined (e.g., averaged) or otherwise filtered across the multiple previous reporting periods. Of course, in still other embodiments, the number of previous CSI reports is dynamically adapted depending on the channel coherence time, the speed of the wireless device 12, or the like. Moreover, the above embodiments may be combined by performing scheduling based on a single previous CSI report under certain dynamically detected conditions, and performing scheduling based on multiple previous CSI reports under other dynamically detected conditions. These conditions may also relate to the channel coherence time, the speed of the wireless device 12, or the like.

Irrespective of the above-discussed possible variations, though, this processing 100 in one or more embodiments is performed consistent with a general strategy at the base station 16 to intelligently account for any potential degradation to or non-optimization of reported CSI attributable to the gating of the subset of common pilot channels. In some embodiments, for example, when the subset is not gated, the subset actually interferes with or otherwise degrades the accuracy with which the wireless device 12 is able to determine CSI from the other common pilot channels. In these embodiments, therefore, the base station's processing 100 seeks to base scheduling on CSI whose accuracy has not been degraded by the subset's transmission. This means that the processing 100 selectively bases scheduling on CSI report(s) that were generated by the device 12 from measurements performed when the transmission of the subset was gated.

Figure 3:
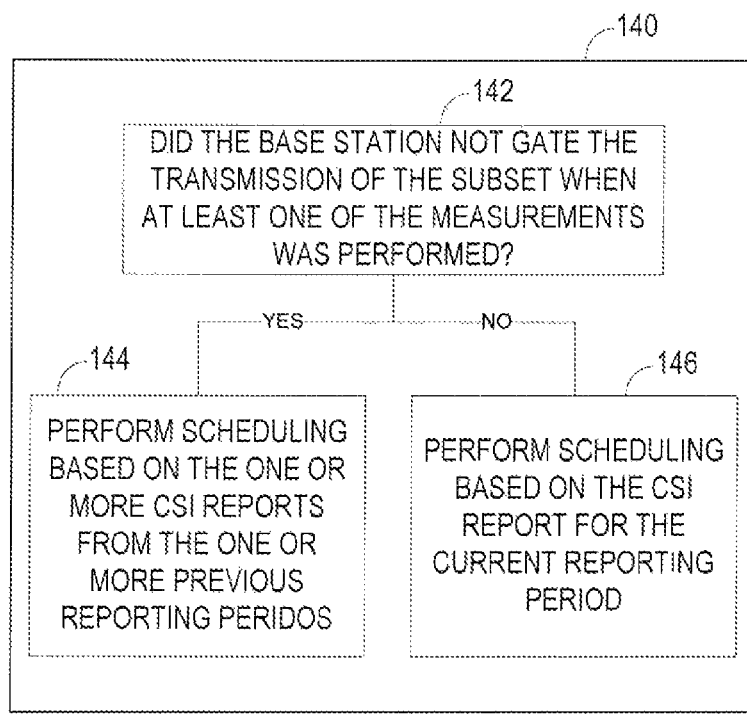
FIG. 3 is a logic flow diagram of processing performed by a base station for selectively performing data transmission scheduling according to one or more embodiments.

Thus, according to one or more embodiments shown in FIG. 3, if the base station 16 did not gate the transmission of the subset when the device 12 performed at least one of the measurements on which the current CSI report is based (YES at Block 142), then the base station 16 performs scheduling based on one or more previous CSI reports from the device 12 (Block 144). For each of these previous CSI reports, the base station 16 did gate the transmission of the subset when the device 12 performed each measurement on which that CSI report was generated. Otherwise, the base station 16 performs scheduling based on the current CSI report from the device 12 (Block 146). Accordingly, rather than using the current CSI report whose accuracy has been degraded by transmission of the subset, the base station's scheduling uses one or more previous CSI reports whose accuracy has not been degraded in that way.

In one embodiment, the obtained information indicates that the base station is to gate the transmission of the subset when the base station is not transmitting data to at least one wireless device 12 (i.e., a non-legacy device) configured to measure the subset. In one example, for instance, the base station 16 is configured to transmit six common pilot channels. Two of those channels (referred to as pilots 1-2) are used by all devices 12 (both legacy and non-legacy) for CSI determination and are transmitted on two antennas (referred to as antennas 1-2) continuously (e.g., with high power). Two others of those channels (referred to as pilots 3-4) are transmitted (e.g., with low power) on the other two antennas (antennas 3-4) and used by only non-legacy devices 12 for CSI determination. The two remaining channels (referred to as pilots 5-6) are used only by non-legacy devices to estimate the channel for demodulation and are transmitted (e.g., with high power) on antennas 3-4 and on an as-needed basis when data is being transmitted to at least one non-legacy device. This subset of pilots 5-6 is therefore gated when the base station is not transmitting data to at least one non-legacy device. When pilots 5-6 are not gated, though, the pilots 5-6 degrade the accuracy of the CSI determined by both legacy and non-legacy devices using pilots 1-4. Accordingly, if the base station 16 did not gate pilots 5-6 when any given wireless device 12 (whether legacy or non-legacy) performed at least one measurement on which the current CSI report is based, the base station 16 performs scheduling based on one or more previous CSI reports from that device 12. Otherwise, the base station 16 performs scheduling based on the current CSI report from the device 12.

While the embodiments just described focused more on accounting for the actual degradation of CSI caused by gating, other embodiments herein focus more on accounting for the CSI not being optimal because of the gating. More specifically, these embodiments recognize that, when the subset is gated, a wireless device 12 otherwise configured to measure that subset for determining CSI is not able to do so. This means that the CSI determined by that device 12 when the subset is gated will not be as reliable or optimal as the CSI determined by the device 12 when the subset is not gated. In these embodiments, therefore, the base station's processing 100 selectively bases scheduling on CSI report(s) that were generated by the device 12 from measurements performed when the transmission of the subset was not gated.

Figure 4:
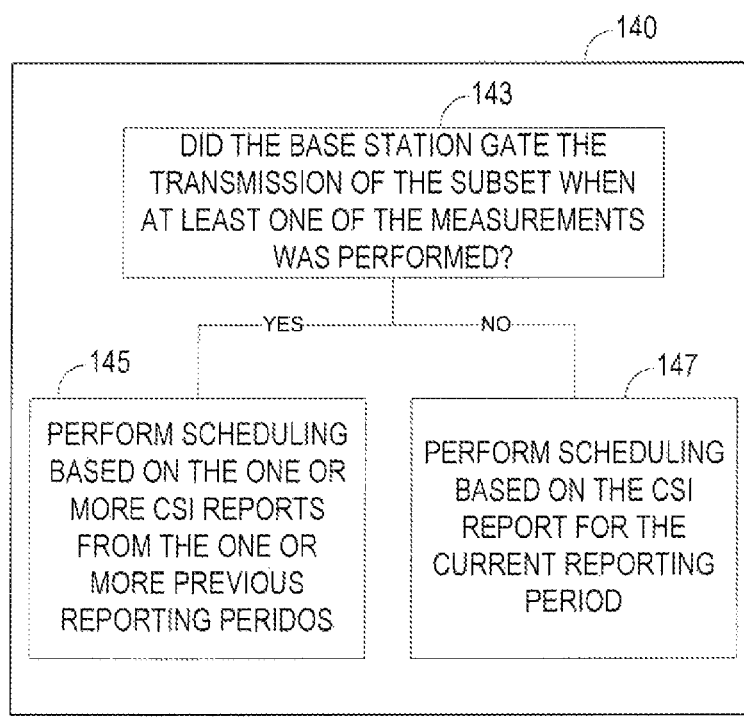
FIG. 4 is a logic flow diagram of processing performed by a base station for selectively performing data transmission scheduling according to one or more other embodiments.

Thus, according to one or more embodiments shown in FIG. 4, if the base station 16 did gate the transmission of the subset when the device 12 performed at least one of the measurements on which the current CSI report is based (YES at Block 143), then the base station 16 performs scheduling based on one or more previous CSI reports from the device 12 (Block 145). For each of these previous CSI reports, the base station 16 did not gate the transmission of the subset when the device 12 performed each measurement on which that CSI report was generated. Otherwise, the base station 16 performs scheduling based on the current CSI report from the device 12 (Block 147). Accordingly, rather than using the current CSI report that is less reliable because it is not based on measurement of the subset, the base station's scheduling uses one or more previous CSI reports that are more reliable because they are indeed based on measurement of the subset. The base station 16 may perform this processing selectively for non-legacy devices, or for all devices legacy and non-legacy alike.

In one embodiment, the obtained information indicates that the base station is to gate the transmission of the subset according to a defined gating pattern. In one example based on 4TX HSDPA, for instance, the base station 16 is configured to transmit four common pilot channels over four different transmit antennas. Two of those channels (referred to as pilots 1-2) are used by all devices 12 (both legacy and non-legacy) for CSI determination and/or data demodulation, and are transmitted continuously on $1^{st}$ and $2^{nd}$ antennas. The remaining two channels (referred to as pilots 3-4) define the subset and are used only by non-legacy devices for CSI determination and/or data demodulation associated with the $3^{rd}$ and $4^{th}$ antennas. Since continuous transmission of the subset of pilots 3-4 causes performance degradation to legacy devices (e.g., in terms of throughput), the base station 16 gates the transmission of that subset according to a defined gating pattern.

Figure 5:
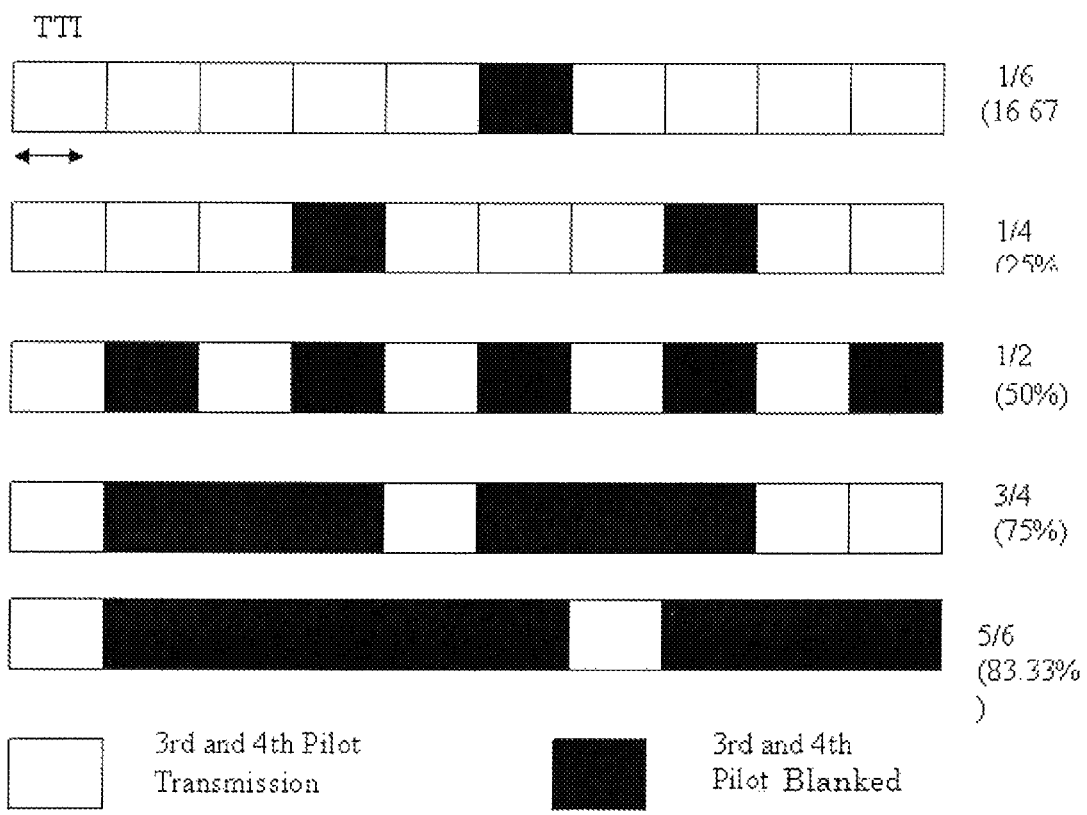
FIG. 5 is a block diagram illustrating multiple examples of a gating pattern used by a base station for gating a subset of common pilot channels according to one or more embodiments.

In some embodiments, this gating pattern is defined at a slot level. In this case of slot level gating, the pilots 3-4 are transmitted only is some fraction of the slots in a frame (e.g., where a frame consists of 15 slots and a sub-frame consists of 3 slots corresponding to a transmission time interval, TTI). In other embodiments, by contrast, the gating pattern is defined at a frame level. In this case of frame level gating, the pilots 3-4 are transmitted only in certain frames. FIG. 5 depicts five different gating patterns in this regard, along with their duty cycles, as a concrete example.

As shown in FIG. 5, a gating pattern with a ⅙ or 16.67% duty cycle dictates that the base station 16 gate (or blank) pilots 3-4 in 16.67% of transmission time intervals (TTIs). That is, the gating duty cycle (GDC)=Number of frames blanked/Total number of frames. Gating or blanking in this regard may entail not transmitting pilots 3-4 at all or may alternatively entail reducing the power level of pilots 3-4 to a minimum value (e.g., −30 dB). When pilots 3-4 are not being gated, though, the pilots are being transmitted, e.g., with a higher, maximum power (such as −13 dB). FIG. 5 of course shows gating patterns with other duty cycles for comparison.

Figure 6:
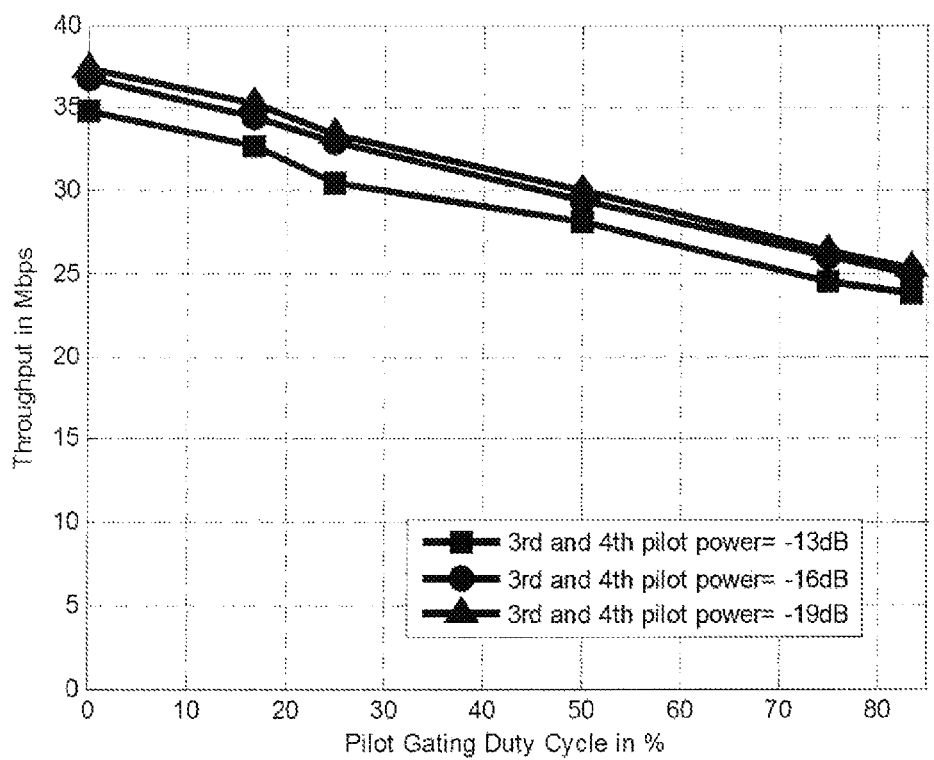
FIG. 6 is a graph illustrating throughput degradation suffered without implementation of one or more embodiments herein.

FIG. 6 shows non-legacy device link throughput in Mbps for different pilot gating patterns at Geometry factor equal to 20 dB. Ideal demodulation is assumed and realistic channel estimation is used for CSI estimation. It can be observed that as the gating duty cycle increases, non-legacy device performance becomes poor due to bad channel estimation for CSI.

FIG. 7 includes tables that quantify this non-legacy device performance loss under different assumptions about channel estimation accuracy. Table 1 in FIG. 7, for example, shows the performance loss due to gating with realistic channel estimation for CSI estimation and ideal demodulation. Table 1 illustrates that the penalty due to gating is severe for higher gating duty cycles irrespective of the pilot power values. Table 2 in FIG. 7 more realistically shows the performance loss due to gating with realistic channel estimation for both CSI estimation and data demodulation. It can be observed that even with low duty cycles the performance loss is significant due to bad channel estimates for data demodulation. Hence, applying pilot gating causes severe reduction in link throughput for non-legacy devices.

According to one or more embodiments herein, therefore, if the base station 16 did gate pilots 3-4 when a non-legacy device 12 performed at least one measurement on which the current CSI report is based, the base station 16 performs scheduling based on one or more previous CSI reports from that device 12. Otherwise, the base station 16 performs scheduling based on the current CSI report from the device 12. Thus, rather than using the current CSI report that is less reliable because it is not based on measurement of pilots 3-4, the base station's scheduling uses one or more previous CSI reports that are more reliable because they are indeed based on measurement of pilots 3-4.

Figure 8:
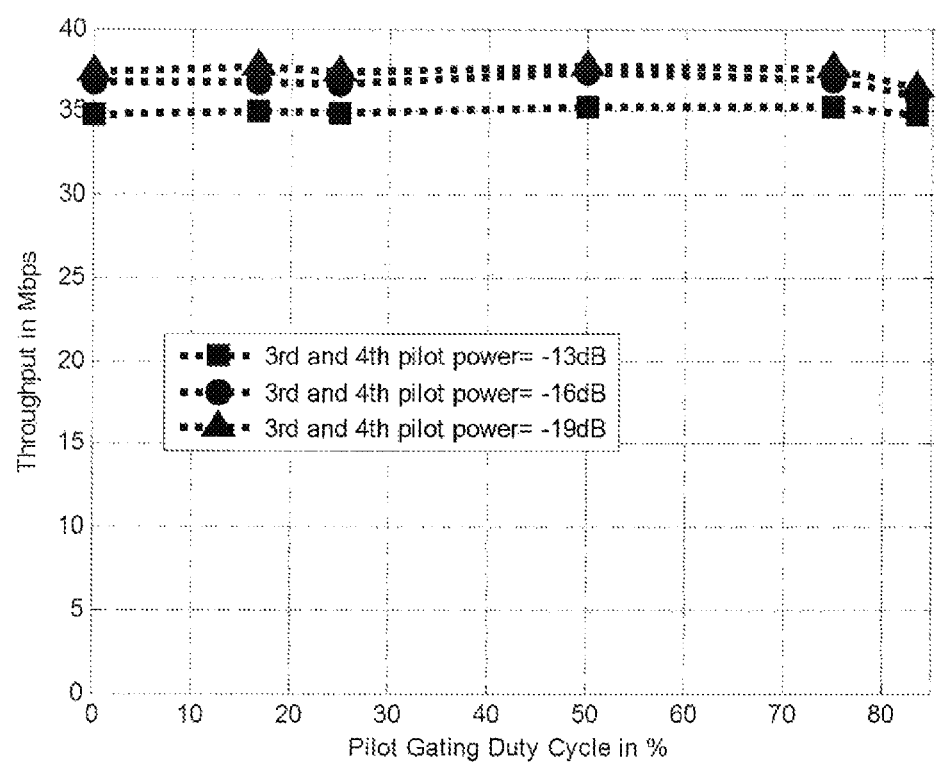
FIG. 8 is a graph illustrating throughput improvements realized by one or more embodiments herein.

FIG. 8 shows the performance improvement achievable by such embodiment in comparison to FIG. 6, assuming ideal demodulation and realistic channel estimation for CSI estimation at geometry=20 dB. As shown, the performance loss with gating is almost negligible.

Figure 9:
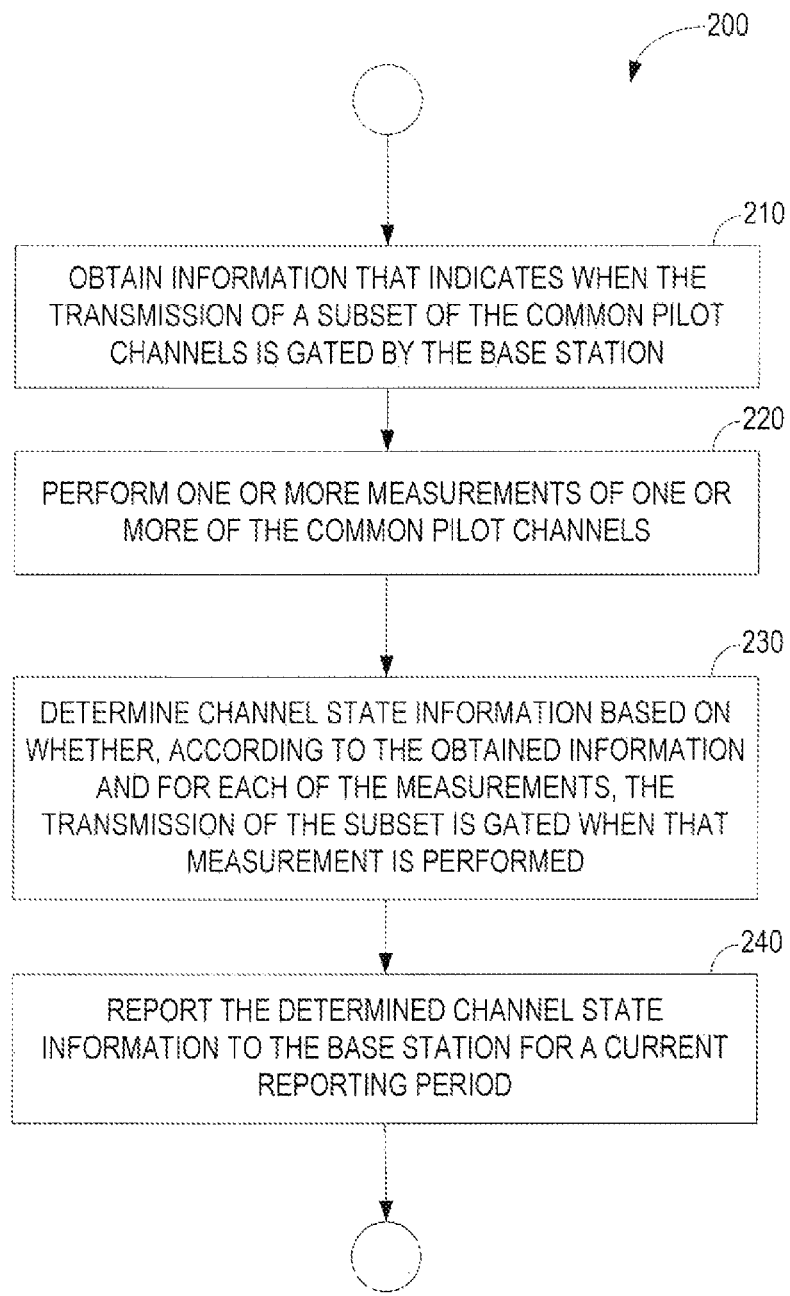
FIG. 9 is a logic flow diagram of a method performed by a wireless device according to one or more embodiments herein.

One or more other embodiments herein include certain aspects of the above base station intelligence in a wireless device 12, rather than in the base station 16. For example, instead of the base station 16 knowingly performing scheduling based on when the subset is gated, the wireless device 12 determines channel state information to report based on when the subset is gated. This way, the base station 16 receives CSI reports that are based on when the subset is gated and therefore "naively" performs scheduling based on when the subset is gated. FIG. 9 illustrates one such embodiment of processing performed by a wireless device 12 for reporting CSI to a multi-antenna base station 16 that transmits a plurality of common pilot channels (e.g., one for each transmit antenna).

As shown in FIG. 9, processing 200 at a wireless device 12 includes obtaining information that indicates when the transmission of the subset of the common pilot channels is gated by the base station 16 (Block 210). Such information may be obtained, for instance, by receiving the information from the base station 16 or from a base station controller (e.g., a radio network controller, RNC) via higher layer signaling (e.g., radio resource control, RRC, signaling). Moreover, such information may be communicated to the device 12 as the start of a data session through session information. Regardless, processing 200 further includes performing one or more measurements of one or more of the common pilot channels (Block 220).

Processing 200 also notably includes determining CSI based on whether, according to the obtained information and for each of the measurements, the transmission of the subset is gated when that measurement is performed (Block 230). Processing then entails reporting the determined CSI to the base station for a current reporting period (Block 240). In broad terms, therefore, these embodiments equip the device 12 with information about the common pilot channel gating applied at the base station 16. The device 12 exploits this information in order to intelligently and selectively determine CSI.

In at least some embodiments, determining 230 CSI in this way involves selectively determining the CSI from measurements performed when the transmission of the subset is gated. That is, any measurements performed when the transmission of the subset was not gated are not used for determining the CSI.

In one or more embodiments, this selective use of measurements for CSI determination resembles the above-described use of previous CSI reports by the base station 16. But rather than the base station 16 selecting between using current or previous CSI reports for scheduling based on when the subset is gated, the wireless device 12 selects between reporting current CSI or re-reporting previous CSI based on when the subset is gated. Broadly, therefore, the device 12 in one or more embodiments determines CSI to be reported for the current reporting period as a function of CSI reported for one or more previous reporting periods, if the base station 16 did not gate the transmission of the subset when at least one of the measurements (associated with the current reporting period) was performed. Otherwise, the device 12 determines CSI to be reported for the current reporting period based on those measurements associated with the current reporting period. Note that each measurement from which the CSI reported for the one or more previous reporting periods was performed when the transmission of the subset was gated. In the example above involving pilots 5-6, for instance, the device 12 determines CSI for a current reporting period as a function of CSI reported for one or more previous reporting periods (e.g., as the CSI reported for the last reporting period), if the base station 16 did not gate pilots 5-6 when at least one of the current reporting period measurements was performed.

In other embodiments, the selective use of measurements for CSI determination involves selectively using a portion of the measurements performed for the current reporting period, rather than employing CSI from one or more previous reporting periods. In one embodiment, for example, this entails determining, based on the obtained information, that a first set of the measurements are performed for the current reporting period when the transmission of the subset is gated, and a second set of the measurements are performed for the current reporting period when the transmission of the subset is not gated. The device 12 in this case selectively determines the CSI from the first set of measurements, but not the second set of measurements.

The device's selective determination in this regard is affected by the time-based granularity with which the base station gates the transmission of the subset, relative to the size of a reporting period. For example, in some HSDPA embodiments, a reporting period corresponds to a 2 ms subframe, while the base station applies gating on a 0.667 ms slot-by-slot basis. In other HSDPA embodiments, though, the base station instead applies gating on a subframe-by-subframe basis. In still other HSDPA embodiments, a reporting period is greater than a 2 ms subframe (e.g., anywhere between 2 ms and 160 ms), while the base station applies gating on a subframe-by-subframe basis, or a slot-by-slot basis. In any case, the particular gating granularity and any time-based pattern with which the base station applies gating may be indicated by the information the device obtains, so that the information effectively indicates when the base station gates the transmission of the subset of common pilot channels.

For example, where a reporting period comprises a subframe and the base station 16 applies gating on a slot-by-slot basis, the wireless device 12 in some embodiments selectively determines channel state information for a current subframe based on common pilot channel measurements performed during those slots of the subframe in which the base station 16 applies gating. Such may entail linearly combining (e.g., averaging) those slot-based measurements in order to determine the channel state information to be reported for the subframe.

In other embodiments, determining 230 CSI involves selectively determining the CSI from measurements performed when the transmission of the subset is not gated. That is, any measurements performed when the transmission of the subset was gated are not used for determining the CSI.

Again, in one or more embodiments, this selective use of measurements for CSI determination resembles the above-described use of previous CSI reports by the base station 16. But rather than the base station 16 selecting between using current or previous CSI reports for scheduling based on when the subset is gated, the wireless device 12 selects between reporting current CSI or re-reporting previous CSI based on when the subset is gated. Broadly, therefore, the device 12 in one or more embodiments determines CSI to be reported for the current reporting period as a function of CSI reported for one or more previous reporting periods, if the base station 16 gated the transmission of the subset when at least one of the measurements (associated with the current reporting period) was performed. Otherwise, the device 12 determines CSI to be reported for the current reporting period based on those measurements associated with the current reporting period. Note that each measurement from which the CSI reported for the one or more previous reporting periods was performed when the transmission of the subset was not gated. In the example above involving pilots 3-4, for instance, a non-legacy device 12 determines CSI for a current reporting period as a function of CSI reported for one or more previous reporting periods, if the base station 16 gated pilots 3-4 when at least one of the current reporting period measurements was performed.

In other embodiments, the selective use of measurements for CSI determination involves selectively using a portion of the measurements performed for the current reporting period, rather than employing CSI from one or more previous reporting periods. In one embodiment, for example, this entails determining, based on the obtained information, that a first set of the measurements are performed for the current reporting period when the transmission of the subset is gated, and a second set of the measurements are performed for the current reporting period when the transmission of the subset is not gated. The device 12 in this case selectively determines the CSI from the second set of measurements, but not the first set of measurements.

For example, where a reporting period comprises a subframe and the base station 16 applies gating on a slot-by-slot basis, the wireless device 12 in some embodiments selectively determines channel state information for a current subframe based on common pilot channel measurements performed during those slots of the subframe in which the base station 16 does not apply gating (e.g., based on common pilot channel measurements performed during the first 2 of the subframe's 3 slots, where the base station applies gating to the third slot). Such may entail linearly combining (e.g., averaging) those slot-based measurements in order to determine the channel state information to be reported for the subframe.

Irrespective of how the base station 16 or wireless device 12 accounts for this gating, the base station 16 according to some embodiments applies gating to the transmission of the subset by simply temporarily refraining from transmitting that subset (or, equivalently, "transmitting" the subset with zero power). Alternatively, in at least some embodiments, gating a common pilot channel may refer to temporarily transmitting the channel with a defined minimum, non-zero power level before reverting back to transmitting the channel with a defined maximum power level. That is, gating in this context entails varying the power of a common pilot channel between a maximum level and a minimum, non-zero level according to a defined time-based gating pattern.

Figure 10:
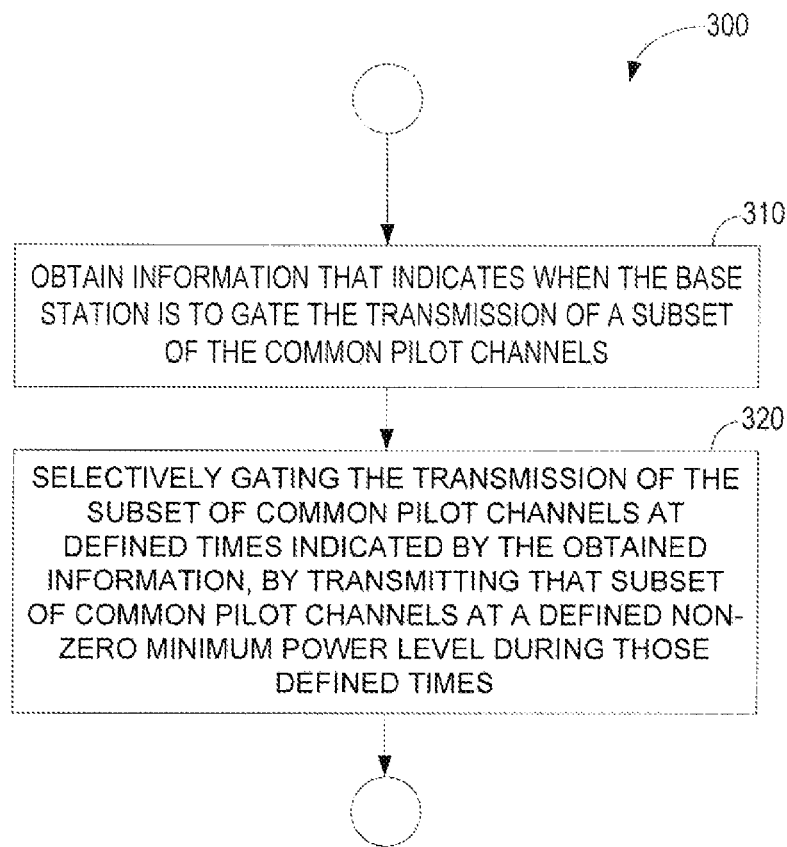
FIG. 10 is a logic flow diagram of a method performed by a base station according to one or more other embodiments herein.

Accordingly, particular embodiments herein may further include a method implemented by a multi-antenna base station configured to transmit a plurality of common pilot channels. As shown in FIG. 10, the method 300 includes obtaining information that indicates when the base station is to gate the transmission of a subset of the common pilot channels (Block 310). The method also includes selectively gating the transmission of the subset of common pilot channels at defined times indicated by the obtained information, by transmitting that subset of common pilot channels at a defined non-zero minimum power level during those defined times (Block 320).

Figure 11:
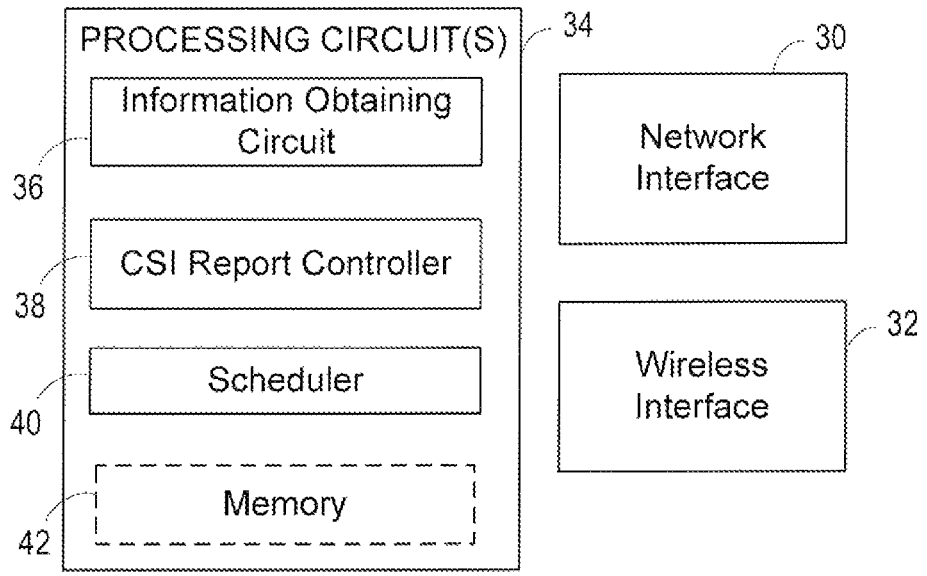
FIG. 11 is a block diagram of a base station configured to perform one or more embodiments herein.

In view of the above modification and variations described with respect to the base station embodiments herein, FIG. 11 depicts an exemplary multi-antenna base station 16. As shown in FIG. 11, the base station 16 includes a network interface 30, a wireless interface 32, and one or more processing circuits 34 configured to function as described above. The network interface 30 is configured to interconnect the base station 16 to other parts of the wireless communication network 10, such as to a base station controller, other base stations, a core network, or the like. The wireless interface 32 may include various radio-frequency components (not shown) to receive and process radio signals from one or more wireless devices 12, using known signal processing techniques. The one or more processing circuits 34 may comprise one or more microprocessors, digital signal processors, and the like. The one or more processing circuits 34 may also comprise other digital hardware and a memory 42 (e.g., ROM, RAM, cache, flash, etc.) that stores program code for executing one or more communications protocols and for carrying out one or more of the techniques for data transmission scheduling described herein. Of course, not all of the steps of these techniques are necessarily performed in a single microprocessor or even in a single module. Thus, FIG. 11 presents a more generalized view of the processing circuits 34 as functionally including an information obtaining circuit 36, a CSI report controller 38, and a scheduler 40.

The information obtaining circuit 36 is configured to obtain, e.g., via the network interface 30, information that indicates when the base station 16 is to gate the transmission of a subset of the common pilot channels. The CSI report controller 38 is configured to receive channel state information reports from a wireless device 12, e.g., via the wireless interface 32, including a CSI report for a current reporting period that was generated by the device 12 based on one or more measurements of one or more of the common pilots channels. The scheduler 40 is configured to determine, based on the obtained information and for each of these measurements, whether the base station 16 gated the transmission of the subset when that measurement was performed. The scheduler 40 is also configured to, depending on that determination, selectively perform data transmission scheduling based on one or more CSI reports received from the wireless device 12 for one or more previous reporting periods.

A base station configured to implement the method of FIG. 10 described above is functionally similar to the base station depicted in FIG. 11.

Figure 12:
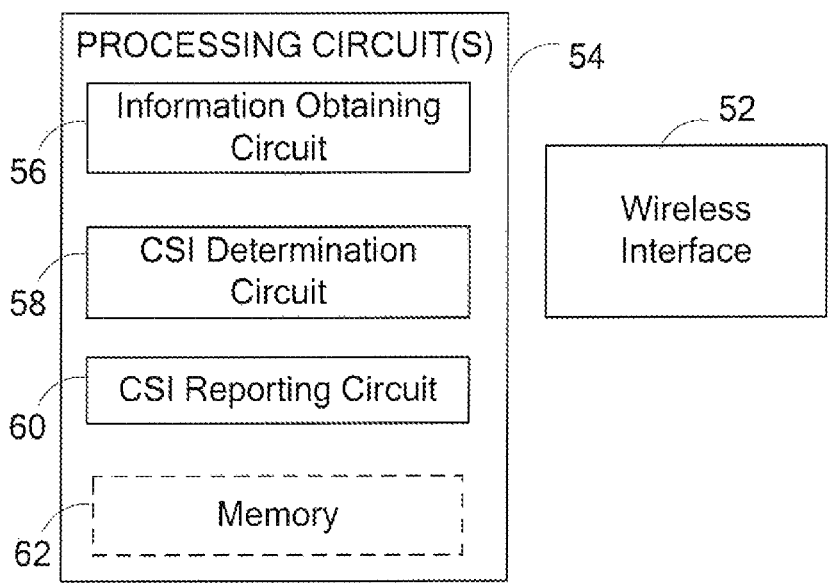
FIG. 12 is a block diagram of a wireless device configured to perform one or more embodiments herein.

Also, In view of the above modification and variations described with respect to the wireless device embodiments herein, FIG. 12 below depicts an exemplary wireless device 12. As shown in FIG. 12, the wireless device 12 includes a wireless interface 52 and one or more processing circuits 54 configured to function as described above. The wireless interface 52 may include various radio-frequency components (not shown) to receive and process radio signals from one or more wireless base stations, using known signal processing techniques. The one or more processing circuits 54 may comprise one or more microprocessors, digital signal processors, and the like. The one or more processing circuits may also comprise other digital hardware and a memory 62 (e.g., ROM, RAM, cache, flash, etc.) that stores program code for executing one or more communications protocols and for carrying out one or more of the techniques for reporting channel state information (CSI) described herein. Of course, not all of the steps of these techniques are necessarily performed in a single microprocessor or even in a single module. Thus, FIG. 12 presents a more generalized view of the processing circuits 54 as functionally including an information obtaining circuit 56, a CSI determination circuit 58, and a CSI reporting circuit 60.

The information obtaining circuit 58 is configured to obtain, e.g., via the wireless interface 52, information that indicates when the base station 16 gates the transmission of a subset of the common pilot channels. The one or more processing circuits 54 are also configured to perform one or more measurements of the one or more common pilot channels. The CSI determination circuit 58 is correspondingly configured to determine channel state information based on whether, according to the obtained information and for each of said measurements, the transmission of said subset is gated when that measurement is performed. Finally, the CSI reporting circuit 60 is configured to report the determined channel state information to the base station 16, via the wireless interface 52.

One or more embodiments herein have been described in the context of a 4TX HSDPA system in order to illustrate a practical example. Those skilled in the art will appreciate however that no particular wireless communication technology or standard is necessary for practicing embodiments herein.

Thus, the present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method implemented by a multi-antenna base station configured to transmit a plurality of common pilot channels, the method comprising:
   obtaining, at the base station, information that indicates when the base station is to gate the transmission of a subset of the common pilot channels;
   receiving, from a wireless device, a channel state information (CSI) report for a current reporting period that was generated by the wireless device based on one or more measurements of one or more of the common pilot channels;
   determining, based on the obtained information and for each of the measurements, whether the base station gated the transmission of the subset when that measurement was performed; and
   depending on the determination whether the base station gated the transmission of the subset, selectively performing data transmission scheduling at the base station based either on:
      one or more CSI reports received from the wireless device for one or more previous reporting periods, or
      the CSI report received from the wireless device for the current reporting period.

2. The method of claim 1, wherein the selectively performing data transmission scheduling comprises:
   performing the scheduling based on the one or more CSI reports for the one or more previous reporting periods if the base station did not gate the transmission of the subset when at least one of the measurements was performed; and
   otherwise performing the scheduling based on the CSI report for the current reporting period.

3. The method of claim 2, wherein, for each of the one or more CSI reports for the one or more previous reporting periods, the base station gated the transmission of the subset when each measurement based on which the wireless device generated that CSI report was performed.

4. The method of claim 1, wherein the selectively performing data transmission scheduling comprises:
   performing the scheduling based on the one or more CSI reports for the one or more previous reporting periods if the base station gated the transmission of the subset when at least one of the measurements was performed; and
   otherwise performing the scheduling based on the CSI report for the current reporting period.

5. The method of claim 4, wherein, for each of the one or more CSI reports for the one or more previous reporting periods, the base station did not gate the transmission of the subset when each measurement based on which the wireless device generated that CSI report was performed.

6. The method of claim 1, wherein the obtained information indicates the base station is to gate the transmission of the subset when the base station is not transmitting data to at least one wireless device configured to measure the subset.

7. The method of claim 1, wherein the obtained information indicates the base station is to gate the transmission of the subset according to a defined gating pattern.

8. The method claim 1, wherein gating the transmission of the subset comprises either refraining from transmitting the subset or transmitting the subset with a defined non-zero minimum power level.

9. A method implemented by a multi-antenna base station configured to transmit a plurality of common pilot channels, the method comprising:
   obtaining information that indicates when the base station is to gate the transmission of a subset of the common pilot channels;
   selectively gating the transmission of the subset of the common pilot channels, at defined time intervals indicated by the obtained information, by transmitting the subset of the common pilot channels at a defined non-zero minimum power level during those defined time intervals; and
   depending on the selective gating of the transmission of the subset of the common pilot channels, performing data transmission scheduling based either on:
      one or more channel state information (CSI) reports received from a wireless device for one or more previous reporting periods, or
      a CSI report received from the wireless device for a current reporting period, the CSI report being generated by the wireless device based on one or more measurements of one or more of the common pilot channels.

10. The method of claim 9, further comprising transmitting the subset of the common pilot channels at a defined maximum level when the obtained information indicates the base station is not to gate the transmission of the subset.

11. The method of claim 9, wherein the obtained information indicates the base station is to gate the transmission of the subset when the base station is not transmitting data to at least one wireless device configured to measure the subset.

12. The method of claim 9, wherein the obtained information indicates the base station is to gate the transmission of the subset according to a defined gating pattern.

13. A multi-antenna base station configured to transmit a plurality of common pilot channels, the base station comprising:
   a wireless interface; and
   one or more processing circuits configured to:
      obtain, at the base station, information that indicates when the base station is to gate the transmission of a subset of the common pilot channels;
      receive, from a wireless device and via the wireless interface, a channel state information (CSI) report for a current reporting period that was generated by the wireless device based on one or more measurements of one or more of the common pilot channels;
      determine, based on the obtained information and for each of the measurements, whether the base station gated the transmission of the subset when that measurement was performed; and
      depending on the determination whether the base station gated the transmission of the subset, selectively perform data transmission scheduling at the base station based either on:
         one or more CSI reports received from the wireless device for one or more previous reporting periods, or
         the CSI report received from the wireless device for the current reporting period.

14. A multi-antenna base station configured to transmit a plurality of common pilot channels, the base station comprising:
   a wireless interface; and
   one or more processing circuits configured to:
      obtain information that indicates when the base station is to gate the transmission of a subset of the common pilot channels;
      cause the wireless interface to selectively gate transmission of the subset of the common pilot channels, at defined time intervals indicated by the obtained information, by transmitting the subset of the common pilot channels at a defined non-zero minimum power level during those defined time intervals; and
      depending on the selective gating of the transmission of the subset of the common pilot channels, performing data transmission scheduling based either on:
         a channel state information (CSI) report for a current reporting period generated by a wireless device based on one or more measurements of one or more of the common pilot channels, or
         one or more CSI reports received from the wireless device for one or more previous reporting periods.

15. A method, implemented by a wireless device, for reporting channel state information to a multi-antenna base station that transmits a plurality of common pilot channels, the method comprising:
   obtaining information that indicates when the transmission of a subset of the common pilot channels is gated by the base station;
   performing one or more measurements of one or more of the common pilot channels;
   determining channel state information based on whether, according to the obtained information and for each of the measurements, the transmission of the subset is gated when that measurement is performed,
   wherein, based on whether the transmission of the subset was gated, the channel state information to be reported for a current reporting period is determined either as a function of the channel state information reported for one or more previous reporting periods, or is determined based on the measurements; and
   reporting the determined channel state information to the base station for the current reporting period.

16. The method of claim 15, wherein the determining comprises selectively determining the channel state information from measurements performed when the transmission of the subset is gated.

17. The method of claim 16:
   wherein the determining comprises:
      determining the channel state information to be reported for the current reporting period as the function of channel state information reported for the one or more previous reporting periods, if the base station did not gate the transmission of the subset when at least one of the measurements was performed; and
      otherwise determining the channel state information to be reported for the current reporting period based on the measurements;
   wherein each measurement from which the channel state information reported for the one or more previous reporting periods was performed when the transmission of the subset was gated.

18. The method of claim 16, wherein the determining comprises:
   determining that a first set of the measurements are performed when the transmission of the subset is gated;

determining that a second set of the measurements are performed when the transmission of the subset is not gated; and selectively determining the channel state information from the first set.

19. The method of claim 15, wherein the determining comprises selectively determining the channel state information from measurements performed when the transmission of the subset is not gated.

20. The method of claim 19:

wherein the determining comprises:

determining the channel state information to be reported for the current reporting period as the function of the channel state information reported for the one or more previous reporting periods, if the base station gated the transmission of the subset when at least one of the measurements was performed; and otherwise determining the channel state information to be reported for the current reporting period based on the measurements;

wherein each measurement from which the channel state information reported for the one or more previous reporting periods was performed when the transmission of the subset was not gated.

21. The method of claim 19, wherein the determining comprises:

determining that a first set of the measurements are performed when the transmission of the subset is gated;

determining that a second set of the measurements are performed when the transmission of the subset is not gated;

selectively determining the channel state information from the second set but not the first set.

22. A wireless device comprising:

a wireless interface; and one or more processing circuits configured to:

obtain information that indicates when transmission of a subset of a plurality of common pilot channels is gated by a base station;

perform one or more measurements of one or more of the common pilot channels;

determine channel state information based on whether, according to the obtained information and for each of the measurements, the transmission of the subset is gated when that measurement is performed, wherein the channel state information, based on whether the transmission of the subset was gated, to be reported for a current reporting period is determined as a function of the channel state information reported for one or more previous reporting periods, or is determined based on the measurements; and cause the wireless interface to report the determined channel state information to the base station for the current reporting period.

* * * * *